United States Patent [19]

Bylsma

[11] 4,181,288
[45] Jan. 1, 1980

[54] FLUID PRESSURE REGULATOR VALVE UNIT FOR A FLUID DELIVERY SYSTEM

[76] Inventor: Simon Bylsma, P.O. Box 3704, Temple, Tex. 76501

[21] Appl. No.: 893,759

[22] Filed: Apr. 5, 1978

[51] Int. Cl.² .......................... F16K 31/04; F16K 5/00
[52] U.S. Cl. .................................... 251/133; 251/305; 138/46; 239/127
[58] Field of Search ............... 251/305, 133, 134, 136; 138/46

[56] References Cited

U.S. PATENT DOCUMENTS

| | | | |
|---|---|---|---|
| 2,393,482 | 1/1946 | Smith | 251/133 X |
| 2,662,547 | 12/1953 | Comeau | 251/133 X |
| 2,928,573 | 3/1960 | Edelstein | 251/133 X |
| 3,693,935 | 9/1972 | Thauer | 251/305 |
| 3,799,434 | 3/1974 | Heidacker | 251/305 X |

*Primary Examiner*—Arnold Rosenthal
*Attorney, Agent, or Firm*—Rudolph L. Lowell; G. Brian Pingel

[57] ABSTRACT

A fluid pressure regulator valve unit for controlling the fluid pressure of a fluid in a delivery line of a fluid system having a housing with a valve chamber of a tubular cylindrical shape, and a butterfly valve rotatably supported in the valve chamber for rotation about an axis extended transversely of the chamber, which butterfly valve has a diameter less than the internal diameter of the chamber so that there is formed at least a minimum flow passage through the chamber in all rotated positions of the valve.

2 Claims, 4 Drawing Figures

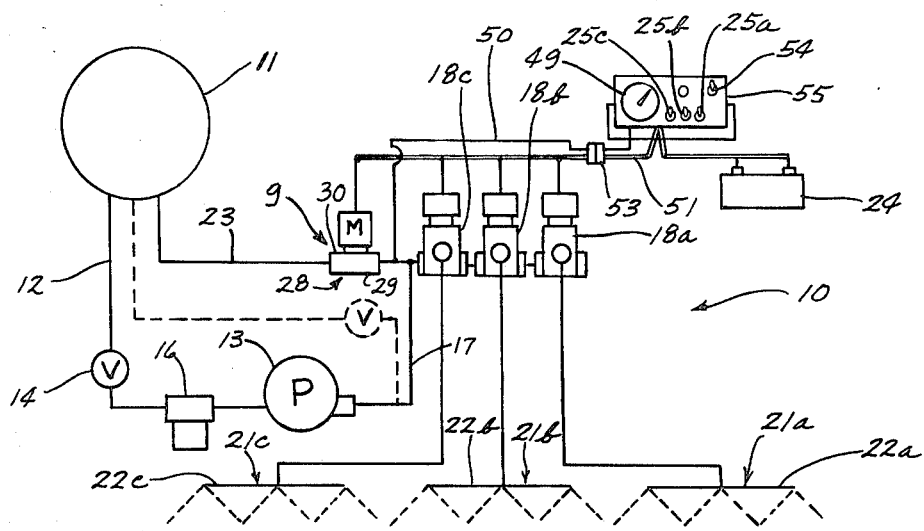
Fig. 1
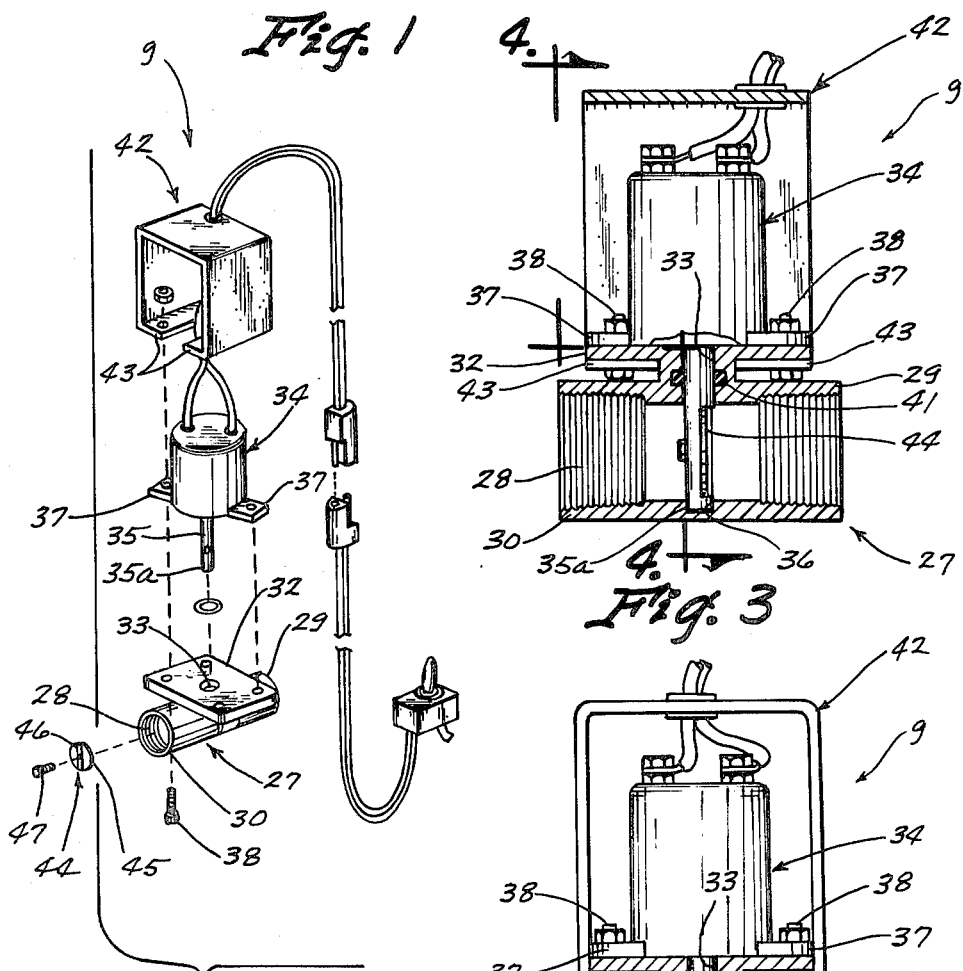
Fig. 2
Fig. 3
Fig. 4

FLUID PRESSURE REGULATOR VALVE UNIT FOR A FLUID DELIVERY SYSTEM

SUMMARY OF THE INVENTION

The present invention provides a motor controlled pressure regulator valve unit adapted to give a reliable and efficient control of the pressure of a fluid being delivered or supplied by a fluid delivery system. The pressure regulator unit is of a rugged and economical construction wherein a butterfly valve rotatable with the shaft of a reversible motor is actuated between open and closed positions to control the working fluid pressure of the system.

The reversible electric motor operates at a speed of about ½ r.p.m. actuated by a two-way electrical toggle switch for a fingertip control so that any setting of the butterfly valve, between the open and closed positions therefor, can be precisely achieved by manipulating the switch. The peripheral surface of the butterfly valve, when the butterfly valve is closed, is in a clearance relation with the valve body to provide a valve flow passage sufficient to prevent pressure surges which could damage a pressure gauge in the main supply line if such line was completely closed, and to also prevent hammering of the system when the valve is moved from an open position to a closed position.

BRIEF DESCRIPTION OF THE DRAWINGS

FIG. 1 is a diagrammatic fluid and electrical circuit diagram of a fluid delivery system in which the fluid pressure regulator valve unit is installed;

FIG. 2 is an exploded perspective view of the pressure regulator unit of the delivery system of FIG. 1;

FIG. 3 is an enlarged sectional view of the pressure regulator of FIG. 2 showing the relative assembly of a reversible motor and butterfly valve which form a part thereof, and wherein the butterfly valve is in a closed position therefor.

FIG. 4 is a sectional view as seen on line 4—4 in FIG. 3.

DETAILED DESCRIPTION OF THE PREFERRED EMBODIMENT

A preferred embodiment of the pressure regulator valve unit of the present invention is shown generally at 9 in FIG. 1 in association with a fluid delivery system 10 of a sprayer apparatus adapted to be carried on a vehicle (not shown) such as a farm tractor. The apparatus 10 includes a tank 11 for a spray solution connected by a line 12 to a fluid pump 13, a directional valve 14, and filter unit 16 series connected in the line 12. Fluid from the pump 13 is delivered through a main supply line 17 to three series connected solenoid actuated shut-off valves 18a, 18b, and 18c corresponding respectively to sprayer boom sections 21a, 21b, and 21c equipped with spray nozzles 22a, 22b, and 22c also, respectively, A bypass line 23 interconnects the supply line 17 with the tank 11. Electrical power for actuating the solenoid actuated shut-off valves 18a, 18b, and 18c is provided by a vehicle battery 24 which is connected to the shut-off valves 18a, 18b, and 18c through respective control switches 25a, 25b, and 25c. The above-described elements of the sprayer apparatus 10 are old in the art as they are in common use on many agricultural spraying units.

The pressure regulator valve unit 9 is connected in the bypass line 23 to maintain a predetermined fluid pressure in the main supply line 17 by controlling the flow of fluid through the bypass line 23. Referring to FIG. 2, the pressure regulator valve unit 9 includes a tubular body member 27 that forms a valve chamber 28 having an inlet end 29, and an outlet end 30. A motor mounting plate 32 integral with the body member 27 is positioned exteriorly therefor. Extended radially through one side of the body member 27 and through the mounting plate 32 for registration with the valve chamber 28 is a bore 33.

A reversible low speed 12-volt D.C. motor 34 has a shaft 35 projected through the bore 33 and chamber 28 (FIG. 3) for bearing engagement of its terminal or free end 35a within a seat 36 formed in the chamber side wall opposite the bore 33. With the shaft 35 thus arranged a pair of mounting flanges 37 on the motor 34 are positioned against the mounting plate 32 for securement thereto by bolts 38. An O-ring 41 in the side wall of the bore 33 prevents fluid leakage about the motor shaft 35. A protective cover or housing 42 for the motor 34 is of a generally channel shape with the legs thereof terminating in inwardly projected flanges 43. With the legs of the housing 42 straddling the mounting plate 32 the flanges 43 are located to the underside of the mounting plate and along a pair of opposite sides thereof. The bolts 38 which secure the motor flanges 37 against the upper side of the mounting plate also connect the motor cover 42 to the underside of the mounting plate.

Within the valve chamber 28 of the valve body 27 is a butterfly valve 44 comprised of a flat disk 45 having a diametrically formed arcuate channel 46 (FIG. 2) for mating engagement with a peripheral portion of the motor shaft 35. The butterfly valve 44 is secured to the shaft 35 for rotation therewith by a screw 47.

In response to a rotation of the motor shaft 35, the butterfly valve 44 is rotatable between a closed position (FIG. 4) wherein the valve 44 extends transversely of the valve chamber 28 and an open position (FIG. 3) wherein the valve 44 extends longitudinally of the valve chamber 28 and to adjusted positions therebetween. Fluid flow through the valve chamber 28 is substantially obstructed when the valve 44 is in the closed position of FIG. 4, and substantially unobstructed when the valve 44 is rotated 90 degrees in either direction from a closed position to the open position of FIG. 3.

As clearly shown in FIG. 4 the diameter of the butterfly valve 44 is slightly less than the internal diameter of the valve chamber 28. As a result, when the valve 44 is in the closed position there is provided an annular clearance or space 48 between the periphery of the valve 44 and the inner surface of the side wall of the valve chamber 28. This clearance 48 serves as a bleed or minimum flow passage for the leakage of fluid from the inlet end 29 to the outlet end 30 when the valve 44 is in its closed position to prevent possible damage to any pressure gauge, such as 49, (FIG. 1) resulting from pressure surges in the bypass line 23, and also, prevents hammering of the system when the valve 44 is moved from an open position to the closed position. Furthermore, because of the clearance 48 between the valve 44 and the chamber 28 manufacture of the pressure regulator unit 9 does not involve precise tolerances and the unit 9 can, therefore, be produced economically and efficiently.

With the pressure regulator unit 26 installed in the supply line 17, lead wires 51 for the electric motor 34 are connected to a quick disconnect coupling 53, and a two-way electrical switch 54 to the vehicle battery 24.

The switch 54 is preferably mounted on a control panel 55 conveniently mounted for observation by and access to the operator of the tractor on which the sprayer apparatus 10 is carried. The switch 54 is a double pole, double throw toggle switch movable to positions for actuating the reversible motor 34 in opposite directions to increase or decrease the fluid pressure within the main supply line 17. The pressure gauge 49 may be mounted on the control panel 55 so that the operator has a continuous visual indication of the spraying pressure without detraction from the field or crops in the direction of tractor travel.

If the spraying pressure is increased or decreased by changes in the tractor speed or direction, the operator need only manipulate switch 54 to adjust the butterfly valve 44 for increasing or decreasing the spraying pressure. By jogging the switch 54 in opposite directions, virtually any setting of the butterfly valve 44 between open and closed positions therefor can be precisely achieved since the motor 34, as previously mentioned, has a rotational speed of about ½ r.p.m.

In one embodiment of the invention for agricultural spraying use, the pressure gauge 49 has a range of 0-60 p.s.i. and the motor 34 is operable to provide a 30-second valve cycle for movement of the butterfly valve 44 from a fully open to a closed position therefor.

Whereas the invention has been described in connection with a preferred embodiment thereof, it is to be understood that it is not to be so limited since changes and modifications can be made therein which are within the full intended scope of the invention as defined by the appended claims.

I claim:

1. A liquid pressure regulator valve unit for controlling the pressure of a spray solution in a delivery line of a liquid system for supplying liquid to at least one outlet at a desired pressure, said valve unit comprising:
   (a) a body member having a valve chamber with open ends,
   (b) said body member having a side wall with a bore therethrough open to said valve chamber,
   (c) a low speed reversible electric motor mounted on said body member having an output shaft extended through said bore into said valve chamber,
   (d) means for providing a liquid seal between said motor shaft and the periphery of the bore in said body member,
   (e) a valve means within said valve chamber secured to said motor shaft for rotation therewith to an adjusted position between an open position, wherein liquid flow through said valve chamber is substantially unobstructed, and a closed position, said valve means having a diameter less than the internal diameter of said chamber so that there is formed a minimum flow passage through said valve chamber when said valve is in the closed position therefor to prevent hammering in the system as said valve is moved to the closed position; and
   (f) an electric circuit for said motor including a switch means for reversely operating said motor to rotate said valve means to an adjusted position to precisely control the pressure of the spray solution in the delivery line.

2. The fluid pressure regulator valve unit, according to claim 1, wherein:
   (a) said motor has a rotational speed of about ½ r.p.m.; and
   (b) said switch means includes a two-way toggle switch selectively operable to actuate the electric motor for rotation in a selected direction.

* * * * *